United States Patent
Lennykh et al.

(10) Patent No.: US 10,702,846 B2
(45) Date of Patent: *Jul. 7, 2020

(54) METHODS FOR REDUCING THE VISCOSITY OF A LIQUID

(71) Applicant: Active Resource Technologies Ltd., London (GB)

(72) Inventors: Konstantin Lennykh, Ekaterinburg (RU); Konstantin Selivanov, Ekaterinburg (RU)

(73) Assignee: Active Resource Technologies Ltd., London (GB)

(*) Notice: Subject to any disclaimer, the term of this patent is extended or adjusted under 35 U.S.C. 154(b) by 10 days.

This patent is subject to a terminal disclaimer.

(21) Appl. No.: 16/109,032

(22) Filed: Aug. 22, 2018

(65) Prior Publication Data

US 2018/0361344 A1    Dec. 20, 2018

Related U.S. Application Data

(63) Continuation of application No. 14/571,592, filed on Dec. 16, 2014, now Pat. No. 10,076,740.

(60) Provisional application No. 61/916,286, filed on Dec. 16, 2013.

(51) Int. Cl.
*C10G 15/08* (2006.01)
*B01J 19/00* (2006.01)
*B01J 19/18* (2006.01)

(52) U.S. Cl.
CPC ....... *B01J 19/0033* (2013.01); *B01J 19/1806* (2013.01); *C10G 15/08* (2013.01); *B01J 2219/00164* (2013.01); *B01J 2219/00168* (2013.01); *B01J 2219/00171* (2013.01); *B01J 2219/00202* (2013.01); *B01J 2219/00211* (2013.01); *B01J 2219/00231* (2013.01); *C10G 2300/206* (2013.01); *C10G 2300/302* (2013.01); *C10G 2300/308* (2013.01)

(58) Field of Classification Search
None
See application file for complete search history.

(56) References Cited

U.S. PATENT DOCUMENTS

| | | | |
|---|---|---|---|
| 10,076,740 B2 * | 9/2018 | Lennykh | C10G 15/08 |
| 2004/0035749 A1 | 2/2004 | Khan et al. | |
| 2005/0269244 A1 | 12/2005 | Zare | |
| 2009/0312872 A1 | 12/2009 | Burris et al. | |
| 2015/0166904 A1 * | 6/2015 | Lennykh | B01J 19/0033 203/28 |

FOREIGN PATENT DOCUMENTS

| | | |
|---|---|---|
| CA | 2400188 A1 | 8/2001 |
| EP | 1260266 A1 | 11/2002 |

OTHER PUBLICATIONS

International Search Report and Written Opinion, PCT/EP2014/078061, dated Mar. 30, 2015.

* cited by examiner

*Primary Examiner* — Derek N Mueller

(74) *Attorney, Agent, or Firm* — Entralta P.C.; Justin G. Sanders; Peter D. Weinstein

(57) ABSTRACT

A device and method are disclosed to mix two or more liquids to reduce their viscosity, specific gravity or density. The device can also take a heavy fuel oil and following treatment, produce a lighter fuel oil. The invention also comprises a method and procedure for mixing two or more liquids as well as producing a lighter fuel oil from a heavy fuel oil.

11 Claims, No Drawings

METHODS FOR REDUCING THE VISCOSITY OF A LIQUID

RELATED APPLICATIONS

This is a continuation application of a prior filed and currently pending application having Ser. No. 14/571,592 and filing date of Dec. 16, 2014.

This application claims priority and is entitled to the earliest effective filing date of U.S. non-provisional application Ser. No. 14/571,592, filed on Dec. 16, 2014, which claims priority and is entitled to the filing date of U.S. provisional application Ser. No. 61/916,286, filed on Dec. 16, 2013. The contents of the aforementioned applications are incorporated by reference herein.

BACKGROUND

The subject of this patent application relates generally to industrial processing of liquids, and more particularly to methods for reducing the viscosity of a liquid.

Applicant(s) hereby incorporate herein by reference any and all patents and published patent applications cited or referred to in this application.

Much of the oil that is being pumped out of the earth is heavy oil comprised of large hydrocarbon molecules that form a viscous solution known as a heavy oil. Heavy crude oil or extra heavy crude oil is oil that is highly viscous, and cannot easily flow to production wells under normal reservoir conditions. It is referred to as "heavy" because its density is higher and its specific gravity is lower than that of light crude oil. Heavy crude oil has been defined as any liquid petroleum with an API gravity less than 20°. Physical properties that differ between heavy crude oils and lighter grades include higher viscosity and specific gravity, as well as heavier molecular composition. In 2010, the World Energy Council ("WEC") defined extra heavy oil as crude oil having a gravity of less than 10° and a reservoir viscosity of more than 10,000 centipoises. When reservoir viscosity measurements are not available, extra-heavy oil is considered by the WEC to have a lower limit of 4° API (i.e., with density greater than 1000 kg/m$^3$ or, equivalently, a specific gravity greater than 1 and a reservoir viscosity of more than 10,000 centipoises. Heavy oils and asphalt (also known as bitumen) are dense non-aqueous phase liquids (DNAPLs). They have a low solubility and have a higher viscosity and density than water.

In some instances, when the viscosity of the oil is so thick it does not flow easily, for example, when put into a pipeline. This can result in a requirement that the oil be treated by cutting it with solutions that can be expensive, heating the pipeline to lower viscosity or shipping the oil through another means, for instance, in a tanker truck. Each of these adds cost to the production of the oil, which is reflected in higher prices for finished goods derived from the oil. Thus, there is a need to provide a device and a method that can condition a liquid comprised of large molecules, such as heavy oil or bitumen, recombining its molecular structure so that it has a lower viscosity and as a result flows better.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing methods for reducing the viscosity of a liquid. In at least one embodiment, a device and method are disclosed to mix two or more liquids to reduce their viscosity, specific gravity or density. The device can also take a heavy fuel oil and following treatment, produce a lighter fuel oil. The invention also comprises a method and procedure for mixing two or more liquids as well as producing a lighter fuel oil from a heavy fuel oil.

Other features and advantages of aspects of the present invention will become apparent from the following more detailed description, taken in conjunction with the accompanying drawings, which illustrate, by way of example, the principles of aspects of the invention.

DETAILED DESCRIPTION

In an embodiment, the present invention discloses a method using resonance excitation of a liquid, including, without limitation, a hydrogen-bonded liquid, through the use of an oscillatory exposure of a liquid, including, without limitation, a mixture of two or more liquids, for deconstructive recombination of their chemical bonds at a molecular level to facilitate a relatively lower viscosity. At the outset, it should be noted it is known that resonance excitation is capable of acting as a source of energy for recombination of molecular structure and chemical bonds. An example of such teachings can be found in EP 1260266, the contents of which are hereby incorporated herein by reference. Furthermore, the methods disclosed herein are intended to be carried out, in at least one embodiment, using a device similar to that taught in EP 1260266. Thus, any reference made herein to exemplary devices or structural components related thereto is intended to be referring to said devices and/or structural components described in EP 1260266, in at least one embodiment. Through the use of the methods disclosed herein, in combination with such a device, a liquid—such as heavy oil (including bitumen), for example—could be transformed such that the liquid that is processed in a resonance excitation device is made to flow better and allows for the transport of the liquid through a pipeline. This not only saves money, but time and effort. This same device is also capable of using resonance excitation to mix two or more liquids—for example, a heavy oil or bitumen with a cutter.

In an embodiment, the resonance excitation occurs through the transfer of the energy created by mechanical oscillations, by, without limitation, a source placed into a liquid that is capable of operating on one of the basic frequencies. Through the use of such a resonance excitation, the viscosity of a liquid, including without limitation, a hydrogen bonded liquid, including, without limitation, a heavy oil or bitumen, including, without limitation, a high paraffinic crude oil, is reduced. In an embodiment, a basic frequency abides by the common relationship $FN = F1 N^{-1/2}$, where $N >= 1$—the selected integer;

F1=63.992420 [kHz]—the basic oscillation frequency at N=1.

In another embodiment, a method for resonant excitation of a mixture of two or more liquids is administered through the excitation of the hydrogen-bonded liquids with a rotary hydrodynamic source.

In an embodiment, a hydrodynamic source uses mechanical oscillations. In a further embodiment, the mechanical oscillations are effectuated on the two or more liquids by moving the liquids into a cavity of a working wheel that rotates inside a stator. In this embodiment, the two or more liquids are discharged thorough a series of outlet openings that are evenly spread on the peripheral circumference of the rotor, into an annular chamber created by the coaxial wall and the peripheral circumference of the rotor. In a further embodiment, the outlet openings are not evenly spread. In another embodiment the openings are the same size. In a further embodiment, the openings are of different sizes. In a still further embodiment, two or more openings are of the same size, while one or more openings are of a different size. In an embodiment, at least two or more openings are of the same size. In another embodiment, at least two or more openings are of the same size and one or more openings are of a different size. In an embodiment, at least three, four, five, six, seven, eight, nine, ten, eleven, twelve, thirteen, fourteen, fifteen, sixteen, seventeen, eighteen, nineteen, twenty or more openings are of the same size. In an embodiment, at least three, four, five, six, seven, eight, nine, ten, eleven, twelve, thirteen, fourteen, fifteen, sixteen, seventeen, eighteen, nineteen, twenty or more openings are of a different size.

In an embodiment, following the discharge of a mixture of two or more liquids from the annular chamber, the resonant excitation of the mixture of two or more liquids is affected. In an embodiment, the mixture of two or more liquids is affected, at least in part, by the relationship set forth in the following formula:

$nR=1.16141F$, where $n[1/s]$—the rotation frequency of the working wheel;

R [m]—the radius of the peripheral surface of the working wheel

In an embodiment, a mechanism for driving a rotor comprises a system for controlling the rotation frequency of the rotor, wherein, the deviation of rotation is 0.1%, ~0.2%, ~0.3%, ~0.4%, ~0.5%, ~0.6%, ~0.7%, ~0.8%, ~0.9%, ~1%, ~2%, ~3%, ~4%, ~5%, ~6%, ~7%, ~8%, ~9%, ~10%, ~11%, ~12%, ~13%, ~14%, ~15%, ~16%, ~17%, ~18%, ~19%, ~20%, ~21%, ~22%, ~23%, ~24%, ~25%, ~26%, ~27%, ~28%, ~29%, ~30%, ~35%, ~40%, ~45% or ~50% from the calculated value thereof. In an embodiment, a control of the rotation frequency of a rotor is manifested through a device, wherein the device includes, without limitation a computer and/or a mechanical device. In an embodiment, a computer includes a program to control the rotation frequency of a rotor. In an embodiment, and without limitation, the program is a software program. In a further embodiment, a software program regulates all aspects of the rotation frequency of a rotor. In another embodiment, a software program regulates some, but not all aspects of the rotation frequency of a rotor. In an embodiment, a software program adjusts the rotation frequency of a rotor based on the density of a liquid, including, without limitation, a hydrogen-bonded liquid, including, without limitation, a heavy oil or bitumen, including, without limitation, a high paraffinic crude oil. In another embodiment a software program increases the rotation frequency of a rotor as the density of a liquid, including, without limitation, a hydrogen-bonded liquid, including, without limitation, a heavy oil or bitumen, including, without limitation, a high paraffinic crude oil, increases and decreases the rotation frequency of a rotor as the density of a liquid, including, without limitation, a hydrogen-bonded liquid, including, without limitation, a heavy oil or bitumen, including, without limitation, a high paraffinic crude oil.

In an embodiment, the control of the rotation frequency of a rotor is manifested through a device, wherein the rotation frequency is adjusted to take into consideration such elements as, and without limitation, the viscosity, the pour point, flash point, the asphaltene and wax content, the paraffin content and/or the flow temperature. In a further embodiment, the control of the rotation frequency of a rotor is manifested through a device wherein the rotation frequency is adjusted to take into consideration such elements as, and without limitation, the chemical composition and/or rheology of the liquid.

In an embodiment, the flow may be adjusted and the proportion of the liquids being blended may be adjusted taking into consideration such elements as viscosity, and other factors that can affect viscosity.

In an embodiment, a device for resonant excitation of liquids, including, without limitation, a hydrogen-bonded liquid, including, without limitation, a heavy oil or bitumen, including, without limitation, a high paraffinic crude oil, is effectuated with the use of a rotary hydrodynamic source of mechanical oscillations. In an embodiment, and without limitation, a rotary hydrodynamic source of mechanical oscillations includes, without limitation, a rotor, a shaft resting on bearings and/or at least one working wheel installed on the shaft, wherein, the working wheel includes, without limitation, a disc with a peripheral annular wall having a series of outlet openings for a liquid, including, without limitation, a hydrogen-bonded liquid, including, without limitation, a heavy oil or bitumen, including, without limitation, a high paraffinic crude oil, that are evenly spaced along the circumference; a stator, having, without limitation, a wall coaxial to the working wheel; an intake opening for the supply of a liquid, including, without limitation, a hydrogen bonded liquid, including, without limitation, a heavy oil or bitumen, including, without limitation, a high paraffinic crude oil, that is capable of communicating with a cavity of the working wheel; a discharge opening for outflow of a liquid, including, without limitation, a hydrogen bonded liquid, including, without limitation, a heavy oil or bitumen, including, without limitation, a high paraffinic crude oil; an annular chamber formed by the coaxial wall of the stator and/or peripheral annular wall of the working wheel and communicating with the discharge opening of the stator, and a means for driving the rotor with a preset rotation frequency, such that the value of the external radius of the peripheral annular wall of the working wheel constitutes $R=2.8477729n-\frac{2}{3}0.10\ 4$ [mm], where
$n=14.651908F3$ [r.p.m.]-the rotation frequency of the working wheel;

$F=63.992420N-\frac{1}{2}$ [kHz]—the basic frequency of resonant excitation;

N>=1—the selected integer,
while the value of the internal radius of the coaxial wall of the stator constitutes $R1=R+B\ S(2.\text{pi.})-1$ [mm], where B>=1—the selected integer;
S=7.2973531 [mm]—the pitch of outlet openings of the working wheel along the circumference of the radius R.

In an embodiment, the radial extent of an outlet opening of a working wheel of a device is made multiple to the value S(2.pi.)−1.

In an embodiment, the radial extent of an outlet opening of a working wheel is made equal to the value S(2.pi.)−1.

In another embodiment, a device capable of creating a resonance excitation can mix two or more liquids. In a further embodiment, a device capable of creating a resonance excitation can mix two or more liquids evenly. In an embodiment, a device capable of creating a resonance excitation can mix two or more liquids evenly and the liquids stay evenly mixed for a period of time after the mixing occurs. In an embodiment, the two or more liquids stay evenly mixed for 1 day, 2 days, 3 days, 4 days, 5 days, 6 days, 7 days, 8 days, 9 days, 10 days, 11 days, 12 days, 13 days, 14 days, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 17 weeks, 18 weeks, 19 weeks, 20 weeks, 21 weeks, 22 weeks, 23 weeks, 24 weeks, 25 weeks, 26 weeks, 27 weeks, 28 weeks, 29 weeks, 30 weeks, 31 weeks, 32 weeks, 33 weeks, 34 weeks, 35 weeks, 36 weeks, 37 weeks, 38 weeks, 39 weeks, 40 weeks, 41 weeks, 42 weeks, 43 weeks, 44 weeks, 45 weeks, 46 weeks, 47 weeks, 48 weeks, 49 weeks, 50 weeks, 51 weeks, 52 weeks, 13 months, 14 months, 15 months, 16 months, 17 months, 18 months, 19 months, 20 months, 21 months, 22 months, 23 months, 24 months, 25 months, 26 months, 27 months, 28 months, 29 months, 30 months, 31 months, 32 months, 33 months, 34 months, 35 months, 36 months, or more.

In an embodiment, a device to mix/blend a liquid, including, without limitation a hydrogen-bonded liquid, including, without limitation, a heavy oil or bitumen, including, without limitation, a high paraffinic crude oil, includes, without limitation, a 50 Hz or 60 Hz electric motor; a variable frequency drive for adjustment of the rotation speed of the electric motor; a feed supply line to the device, including, without limitation, a primary line; and one or more auxiliary lines for supply of the required amount of liquids and/or a blend discharge line that runs from the device. In an embodiment, each line is equipped, without limitation, with a pressure meter or pressure gauge; a thermocouple or temperature gauge; a flow meter; a viscosity meter; a mass meter; a density meter; a primary flow shut off valve; an automatic or manual driven flow adjustment valve; and/or an additional pump to facilitate the flow of a liquid through the device.

In an embodiment, a device is automated so that it can adjust automatically to changes in the composition of the liquid that is run through it. For instance, if the liquid is a heavy fuel oil, as the composition of the fuel oil changes, the device is adjusted automatically to take into account the change in the composition of the fuel oil. In an embodiment, the automation works through the use of a computer. In a further embodiment, the automation is conducted through the use of a software program.

In an embodiment, a device is fixed on a custom fabricated skid frame. In another embodiment, a device is fixed on a solid surface, including, without limitation, a hard wood floor, a tile floor, a concrete floor, an asphalt floor, a dirt floor, a ceramic floor, a vinyl floor and/or any other floor that is capable of supporting the device. In an embodiment, a device is fixed on a vehicle that is able to move, including, without limitation, a truck, a trailer, a plane, a boat, including, without limitation, a barge, a tanker and/or a super tanker.

In another embodiment, a liquid for blending may include a liquefied hydrogen containing gas. In this embodiment, a liquefied gas supply line is without limitation, equipped with a compressor. In an embodiment, a blend discharge line through which a blended liquid flows is equipped with a gas flow meter; a pressure meter or pressure gauge; a thermocouple or temperature gauge; a flow meter; a viscosity meter; a mass meter; a density meter; a primary flow shut off valve; an automatic or manual driven flow adjustment valve; and/or an additional pump to facilitate the flow of a liquid through the device.

In an embodiment, a method and a device are capable, without limitation, of blending a mixture of two or more liquids, including without limitation, a hydrogen-bonded liquid, and further, without limitation, a heavy oil or bitumen, including, without limitation, a high paraffinic crude oil with a diluent, including, without limitation, a light cutter stock, such as, without limitation, a diluent, or solvent, which is a light hydrocarbon to reduce the viscosity and specific gravity of the crude oil being processed. Including, but not limited to a straight run diesel distillate, a straight run kerosene distillate, a straight run naphtha distillate, a straight run distillate slurry, an oil product slurry, a liquefied hydrogen containing gas, a gas condensate and/or a lighter or high API crude, including, but not limited to, a shale oil, a light high API crude oils, other crude oils, including, without limitation, a crude oil that is lighter than a liquid into which a diluent is added, including a crude oil.

In a further embodiment, through processing of a liquid using a device, including, without limitation, a hydrogen-bonded liquid, wherein, the processing reduces the viscosity of a liquid, including, without limitation, a hydrogen-bonded liquid, including, without limitation, a heavy oil or bitumen, including, without limitation, a processed high paraffinic crude oil is reduced by at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100%.

In another embodiment, the pour point of a liquid, including, without limitation, a hydrogen-bonded liquid, including, without limitation, a heavy oil or bitumen, including, without limitation, a high paraffinic crude oil is reduced by at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or at least 100%.

In an embodiment, the volume of a liquid, including, without limitation, a hydrogen-bonded liquid, including, without limitation, a heavy oil or bitumen, including, without limitation, a high paraffinic crude oil increases at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% of at least 100% following the processing of the liquid including, without limitation, a hydrogen-bonded liquid, including, without limitation, a heavy oil or bitumen, including, without limitation, a high paraffinic crude oil.

In an embodiment, a fractionation process of a liquid, including, without limitation, a hydrogen-bonded liquid, and further including, without limitation, a heavy oil or bitumen, including, without limitation, a high paraffinic crude oil by way of distillation, comprising, without limitation, a preliminary treatment of the liquid with the help of a device, including, without limitation, a pre-installed rotary hydrodynamic source of mechanical oscillations, followed by, without limitation, the supply of the preliminarily treated liquid into a fractionating tower and the outflow of distilled and residual fractions. In a further embodiment, a fractionation process includes a diversion of part of a general flow of a liquid that is to be fractionated, wherein the diverted part of a general flow is subjected to a preliminary treatment with a device, following which the diverted flow and a non-diverted flow are combined prior to feeding the combined liquid into a fractionating tower. In a further embodiment, a fractionation process includes a diversion of part of a general flow of a liquid that is to be fractionated, wherein the diverted part of a general flow is subjected to a preliminary treatment with a device and the non-diverted flow is also subjected to a preliminary treatment with a device, wherein, without limitation the diverted flow and non-diverted flow are subject to the same preliminary treatment or are subjected to a different preliminary treatment, following which the diverted flow and a non-diverted flow are combined prior to feeding the combined liquid into a fractionating tower.

In an embodiment, a partial flow amounts to at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% or more of the full flow.

In an embodiment, the amount of a cutter that is added to a liquid, including, without limitation, a heavy oil or bitumen, and further, without limitation, a high paraffinic crude oil that is run through a device is reduced by at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99% as compared to the amount of cutter used when a device is not utilized.

In an embodiment, a method of fractionation includes, without limitation, a partial return into a fractionating tower of its own residual fraction, wherein the returned residual fraction is subjected to a preliminary treatment by way of resonant excitation with a device.

In an embodiment, the invention includes, without limitation, a plant to fractionate a liquid, including, without limitation, a hydrogen-bonded liquid, and further including, without limitation, a heavy oil or bitumen, including, without limitation, a high paraffinic crude oil, by way of distillation, comprising: interconnecting by pipelines a feeding pump; at least one fractionating tower; and a pre-installed rotary hydrodynamic device for the preliminary treatment of liquid, wherein the device for the preliminary treatment of liquid effects resonant excitation of a liquid and the rotary hydrodynamic device is sequentially installed between the outlet of the feeding pump and the inlet of the fractionating tower.

In an embodiment, an inlet of a device for resonant excitation of a liquid including, without limitation, a hydrogen-bonded liquid, and further including, without limitation, a heavy oil or bitumen, including, without limitation, a high paraffinic crude oil, is connected to an inlet of a fractionating tower through a shut-off-control element. In another embodiment, an inlet of a device for resonant excitation of a liquid including, without limitation, a hydrogen-bonded liquid, and further including, without limitation, a heavy oil or bitumen, including, without limitation, a high paraffinic crude oil, is connected to an inlet of a fractionating tower through a shut-off-control element. In another element, a loop of a partial return into a fractionating tower of a residual fraction, comprises, without limitation, a feeding pump and a heating device sequentially interconnected by a pipeline, wherein, and without limitation, into the loop of a partial return of a residual fraction there is sequentially installed a second device for resonant excitation of the liquid including, without limitation, a hydrogen-bonded liquid, and further including, without limitation, a heavy oil or bitumen, including, without limitation, a high paraffinic crude oil.

In an embodiment, a method and a device may be used to blend two (or more) liquids including, without limitation, a hydrogen-bonded liquid, and further including, without limitation, a heavy oil or bitumen, including, without limitation, a high paraffinic crude oil, containing a hydrogen bond, or a liquid and/or a liquefied hydrogen containing a gas.

In an embodiment, a method to use a device to decrease the viscosity of a liquid, including, without limitation, a hydrogen-bonded liquid, and further including, without limitation, a heavy oil or bitumen, including, without limitation, a high paraffinic crude oil, or mix/blend two or more different liquids, includes, but is not limited to the following steps: initiating a method to close a shutoff valve; followed by draining the system of air; establishing a flow through the device of a liquid, including, a hydrogen-bonded liquid and further including, a heavy oil or bitumen, including, without limitation, a high paraffinic crude oil; use of a flow meter to record the flow of a liquid; wherein a cutter is added to the liquid through a cutter line; wherein, a flow meter is used to establish a desired ratio between a cutter and a liquid; and the flow of the liquid and the cutter is modulated through the use of a viscometer, a density meter and/or a mass meter; wherein the viscosity readings are monitored to achieve the desired blend ratio of a liquid and a cutter.

In an embodiment, a method and a device are suitable for blending two or more streams to produce fuel oils of all standard grades. In a further embodiment, use of a device results in a reduction of viscosity of a liquid, including, without limitation a hydrogen-bonded liquid, including, without limitation, a heavy feedstock, wherein the liquid is diluted with a liquid of lower density or specific gravity, including, a light feedstock, wherein, without limitation, the ratio of a heavy feedstock and a lighter feedstock can be mixed in any proportion. In another embodiment, the ratio of a heavy feedstock to a lighter feedstock is 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 2:3, 3:2, 2:5, 5:2, 2:7, 7:2, 2:9, 9:2, 2:11, 11:2, 2:13, 13:2, 2:15, 15:2, 2:17, 17:2, 2:19, 19:2, 3:5, 5:3, 3:7, 7:3, 3:8, 8:3, 3:10, 10:3, 3:11, 11:3, 2:13, 13:3, 3:14, 14:3, 3:16, 16:3, 3:17, 17:3, 3:19, 19:3, 4:5, 5:4, 4:7, 7:4, 4:9, 9:4, 4:10, 10:4, 4:11, 11:4, 4:13, 13:4, 4:14, 14:4, 4:15, 15:4, 4:17, 17:4, 4:18, 18:4, 4:19, 19:4, 5:7, 7:5, 5:8, 8:5, 5:9, 9:5, 5:11, 11:5, 5:12, 12:5, 5:13, 13:5, 5:14, 14:5, 5:16, 16:5, 5:17, 17:5, 5:18, 18:5, 5:19, 19:5 or other ratio.

In an embodiment, a liquid includes, without limitation, fuel oils Nr. 1 thru 6; MGO, MDO, IFO, MFO, HFO, IFO 380, IFO 180, LS380, LS180, LSMGO, ULSMGO, RMA 30, RMB 30, RMD 80, RME 180, RMF 180, RMG 380, RMH 380, RMK 380, RMH 700, RMK 700.

In an embodiment, a blended liquid consists of, without limitation, ATB, VTB, distillate slurry, distillate cutters, light oil cutters, shale oil cutters, and liquefied gas cutters.

In an embodiment, the blend proportions may vary depending on the desired grade of fuel oil, including, without limitation, a quantity of light cutter that comprises no more than 1%, no more than 2%, no more than 3%, no more than 4%, no more than 5%, no more than 6%, no more than 7%, no more than 8%, no more than 9%, no more than 10%, no more than 11%, no more than 12%, no more than 13%, no more than 14%, no more than 15%, no more than 16%, no more than 17%, no more than 18%, no more than 19%, no more than 20%, no more than 21%, no more than 22%, no more than 23%, no more than 24%, no more than 25%, no more than 26%, no more than 27%, no more than 28%, no more than 29%, no more than 30%, no more than 31%, no more than 32%, no more than 33%, no more than 34%, no more than 35%, no more than 36%, no more than 37%, no more than 38%, no more than 39%, no more than 40%, no more than 41%, no more than 42%, no more than 43%, no more than 44%, no more than 45%, no more than 46%, no more than 47%, no more than 48%, no more than 49%, no more than 50%, no more than 51%, no more than 52%, no more than 53%, no more than 54%, no more than 55%, no more than 56%, no more than 57%, no more than 58%, no more than 59%, no more than 60%, no more than 61%, no more than 62%, no more than 63%, no more than 64%, no more than 65%, no more than 66%, no more than 67%, no more than 68%, no more than 69%, no more than 70%, no more than 71%, no more than 72%, no more than 73%, no more than 74%, no more than 75%, no more than 76%, no more than 77%, no more than 78%, no more than 79%, no more than 80%, no more than 81%, no more than 82%, no more than 83%, no more than 84%, no more than 85%, no more than 86%, no more than 87%, no more than 88%, no more than 89%, no more than 90%, no more than 91%, no more than 92%, no more than 93%, no more than 94%, no more than 95% or no more than 96% compared to conventional blending and mixing methods that do not utilize a device, including, without limitation, a device that blends using energy or resonance.

EXAMPLES

Example 1

A device of the invention is manufactured and fixed onto a barge (though it could easily be put onto a different type of boat). The boat is in the harbor and is brought in close proximity of the jetty, pier, terminal or other type of dock, or to another boat of the same size, smaller size or bigger size. A pipe providing heavy oil, including but not limited to high paraffinic crude oil, heavy fuel oil, long residue, including but not limited to flexible pipe, pipe equipped with a CAM-lock, coming from the shore or the other boat is connected to a tube that is attached to a pipe that leads into the device; another pipe providing a diluent including but not limited to straight run diesel or gasoil, kerosene, naphtha, gas condensate, shale oil, vacuum gasoil, diesel fuel, kerosene fuel, MGO, including but not limited to flexible pipe, pipe equipped with a CAM-lock, coming from the shore or the other boat is connected to the a tube that is attached to a pipe that leads into the device.

A second flexible pipe is attached to a pipe that is attached to the device and which receives the outflow of a liquid put through the device. The second flexible pipe is then attached to a connection on the same boat as the invention, the second boat, or on the shore, wherein the connection is attached to a pipe that leads into an empty tank. Following the setup of the device with the jetty, pier, terminal or other type of dock or the second boat, a heavy oil and a cutter are pumped from the jetty, pier, terminal or other type of dock or the second boat into the device. The device is activated and as a result, the heavy oil and the cutter are recombined in a way that results in an oil product that has a reduced viscosity and/or density. The heavy oil is pumped from the device into the empty tank on the same boat as the invention, the second boat, or on the shore. The number of cutter streams may be 1, 2, 3 or more.

Example 2

A device of the invention is manufactured and fixed onto a sled at an oil field. Following collection of a heavy oil, but prior to it being put into a pipeline, the heavy oil is pumped through the device and mixed with a cutter. Through the use of the device, the amount of cutter used is reduced.

Aspects of the present specification may also be described as follows:

1. A method for reducing the viscosity of an at least one liquid using a device configured for resonance excitation of said at least one liquid, the method comprising the steps of: closing a shutoff valve of the device; draining the device of air; establishing a flow through the device of the at least one liquid; recording the flow of said at least one liquid using a flow meter of the device; diluting the at least one liquid with a further liquid of relatively lower density by mixing said liquids using resonance excitation; establishing a desired ratio between said liquids using the flow meter; modulating a flow of said liquids; monitoring a viscosity of said liquids to achieve a desired blend ratio thereof; and performing a fractioning process on said liquids.

2. The method according to embodiment 1, further comprising the step of maintaining an even mixture of said liquids.

3. The method according to embodiments 1-2, wherein the step of establishing a flow through the device of the at least one liquid comprises the step of establishing a flow through the device of an at least one hydrogen-bonded liquid.

4. The method according to embodiments 1-3, wherein the step of establishing a flow through the device of an at least one hydrogen-bonded liquid comprises the step of establishing a flow through the device of an at least one heavy fuel oil.

5. The method according to embodiments 1-4, wherein the step of establishing a flow through the device of heavy fuel oil comprises the step of establishing a flow through the device of a high paraffinic crude oil.

6. The method according to embodiments 1-5, wherein the step of performing a fractioning process comprises the steps of: diverting a portion of the flow of said liquids; subjecting a diverted portion of the flow of said liquids to a preliminary treatment with resonance excitation; combining the diverted portion and a non-diverted portion of the flow of said liquids; and feeding the combined diverted portion and non-diverted portion into a fractioning tower of the device.

7. The method according to embodiments 1-6, further comprising the steps of: returning a portion of a residual fraction from the fractioning tower back into said fractioning tower; and subjecting said returned residual fraction to a preliminary treatment with resonance excitation.

8. The method according to embodiments 1-7, wherein the step of diluting the at least one liquid comprises the step of adding a cutter to the at least one liquid through a cutter line of the device.

9. The method according to embodiments 1-8, wherein the step of adding a cutter to the at least one liquid comprises the step of adding a light hydrocarbon to the at least one liquid to reduce the viscosity and specific gravity of the at least one liquid.

10. The method according to embodiments 1-9, wherein the step of mixing the liquids using resonance excitation comprises the steps of: moving the liquids into a cavity of a working wheel that rotates inside a stator of the device; and discharging the liquids through a series of outlet openings provided along a peripheral circumference of the rotor, into an annular chamber formed by a coaxial wall and the peripheral circumference of the rotor, at which point the resonant excitation of the mixture of liquids is affected.

11. The method according to embodiments 1-10, further comprising the step of controlling a rotation frequency of the rotor based on at least one of the viscosity of the liquids, a pour flash point of the liquids, an asphaltene and wax content of the liquids, a paraffin content of the liquids, a flow temperature of the liquids, a chemical composition of the liquids, and a rheology of the liquids.

12. A method for reducing the viscosity of an at least one liquid using a device configured for resonance excitation of said at least one liquid, the method comprising the steps of: establishing a flow through the device of the at least one liquid; recording the flow of said at least one liquid using a flow meter of the device; diluting the at least one liquid with a further liquid of relatively lower density by mixing said liquids using resonance excitation; establishing a desired ratio between said liquids using the flow meter; modulating a flow of said liquids; monitoring a viscosity of said liquids to achieve a desired blend ratio thereof; diverting a portion of the flow of said liquids; subjecting a diverted portion of the flow of said liquids to a preliminary treatment with resonance excitation; combining the diverted portion and a non-diverted portion of the flow of said liquids; and feeding the combined diverted portion and non-diverted portion into a fractioning tower of the device.

13. A method for reducing the viscosity of a bitumen using a device configured for resonance excitation of said bitumen, the method comprising the steps of: closing a shutoff valve of the device; draining the device of air; establishing a flow through the device of the bitumen; recording the flow of the bitumen using a flow meter of the device; diluting the bitumen with a liquid of relatively lower density by mixing the liquid with the bitumen using resonance excitation; establishing a desired ratio between the bitumen and the liquid using the flow meter; modulating a flow of the bitumen and the liquid; monitoring a viscosity of the bitumen and the liquid to achieve a desired blend ratio thereof; and performing a fractioning process on the bitumen and the liquid.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of the present invention, which is defined solely by the claims. Accordingly, the present invention is not limited to that precisely as shown and described.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for reducing the viscosity of an at least one hydrogen-bonded liquid using a device configured for resonance excitation of said at least one hydrogen-bonded liquid, the method comprising the steps of:
   closing a shutoff valve of the device;
   draining the device of air;
   establishing a flow through the device of the at least one hydrogen-bonded liquid;
   recording the flow of said at least one hydrogen-bonded liquid using a flow meter of the device;
   diluting the at least one hydrogen-bonded liquid with a further liquid of relatively lower density by mixing said liquids using resonance excitation;
   establishing a desired ratio between said liquids using the flow meter;
   modulating a flow of said liquids;
   monitoring a viscosity of said liquids to achieve a desired blend ratio thereof; and
   performing a fractioning process on said liquids, wherein said at least one hydrogen-bonded liquid is a liquid petroleum having an API gravity less than 20°.

2. The method of claim 1, further comprising the step of maintaining an even mixture of said liquids.

3. The method of claim 1, wherein said liquid petroleum having an API gravity of less than 20° is at least one of a bitumen and a high paraffinic crude oil.

4. The method of claim 1, wherein the step of performing a fractioning process comprises the steps of:
   diverting a portion of the flow of said liquids;
   subjecting a diverted portion of the flow of said liquids to a preliminary treatment with resonance excitation;
   combining the diverted portion and a non-diverted portion of the flow of said liquids; and
   feeding the combined diverted portion and non-diverted portion into a fractioning tower of the device.

5. The method of claim 4, further comprising the steps of:
   returning a portion of a residual fraction from the fractioning tower back into said fractioning tower; and
   subjecting said returned residual fraction to a preliminary treatment with resonance excitation.

6. The method of claim 1, wherein the step of diluting the at least one hydrogen-bonded liquid comprises the step of adding a cutter to the at least one hydrogen-bonded liquid through a cutter line of the device.

7. The method of claim 6, wherein the step of adding a cutter to the at least one hydrogen-bonded liquid comprises the step of adding a light hydrocarbon to the at least one hydrogen-bonded liquid to reduce the viscosity and specific gravity of the at least one hydrogen-bonded liquid.

8. The method of claim 1, wherein the step of mixing said liquids using resonance excitation comprises the steps of:
   moving said liquids into a cavity of a working wheel that rotates inside a stator of the device; and
   discharging said liquids through a series of outlet openings provided along a peripheral circumference of the rotor, into an annular chamber formed by a coaxial wall and the peripheral circumference of the rotor, at which point the resonant excitation of the mixture of said liquids is affected.

9. The method of claim 8, further comprising the step of controlling a rotation frequency of the rotor based on at least one of the viscosity of said liquids, a pour flash point of said liquids, an asphaltene and wax content of said liquids, a paraffin content of said liquids, a flow temperature of said liquids, a chemical composition of said liquids, and a rheology of said liquids.

10. A method for reducing the viscosity of an at least one liquid petroleum having an API gravity of less than 20° using a device configured for resonance excitation of said at least one liquid petroleum, the method comprising the steps of:
   establishing a flow through the device of the at least one liquid petroleum;
   recording the flow of said at least one liquid petroleum using a flow meter of the device;
   diluting the at least one liquid petroleum with a further liquid of relatively lower density by mixing said liquid with the at least one liquid petroleum using resonance excitation;
   establishing a desired ratio between said liquid and the at least one liquid petroleum using the flow meter;
   modulating a flow of said liquid and the at least one liquid petroleum;

monitoring a viscosity of said liquid and the at least one liquid petroleum to achieve a desired blend ratio thereof;

diverting a portion of the flow of said liquid and the at least one liquid petroleum;

subjecting a diverted portion of the flow of said liquid and the at least one liquid petroleum to a preliminary treatment with resonance excitation;

combining the diverted portion and a non-diverted portion of the flow of said liquid and the at least one liquid petroleum; and feeding the combined diverted portion and non-diverted portion into a fractioning tower of the device.

11. A method for reducing the viscosity of a bitumen using a device configured for resonance excitation of said bitumen, the method comprising the steps of:

closing a shutoff valve of the device;

draining the device of air;

establishing a flow through the device of the bitumen;

recording the flow of the bitumen using a flow meter of the device;

diluting the bitumen with a liquid of relatively lower density by mixing the liquid with the bitumen using resonance excitation;

establishing a desired ratio between the bitumen and the liquid using the flow meter;

modulating a flow of the bitumen and the liquid;

monitoring a viscosity of the bitumen and the liquid to achieve a desired blend ratio thereof; and performing a fractioning process on the bitumen and the liquid.

* * * * *